US012753530B2

United States Patent
(12) United States Patent
Huang et al.

(10) Patent No.: US 12,753,530 B2
(45) Date of Patent: Oct. 6, 2026

(54) HOLLOW FIBER MEMBRANE MATERIAL FOR HIGH-HUMIDIFICATION HYDROGEN FUEL CELL HUMIDIFIER AND PREPARATION METHOD AND APPLICATION THEREOF

(71) Applicant: University of Electronic Science and Technology of China, Chengdu (CN)

(72) Inventors: Yumin Huang, Chengdu (CN); Miao Wu, Chengdu (CN); Yifei Shi, Chengdu (CN); Jun Peng, Chengdu (CN); Tong Cao, Chengdu (CN); Linbo Wang, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 618 days.

(21) Appl. No.: 18/335,216

(22) Filed: Jun. 15, 2023

(65) Prior Publication Data

US 2023/0323567 A1 Oct. 12, 2023

(30) Foreign Application Priority Data

Jun. 16, 2022 (CN) ......................... 202210683895.8

(51) Int. Cl.

| | |
|---|---|
| ***D01D 5/24*** | (2006.01) |
| ***C08J 9/28*** | (2006.01) |
| ***C08L 71/12*** | (2006.01) |
| ***D01D 5/06*** | (2006.01) |
| ***D01F 1/08*** | (2006.01) |
| ***H01M 8/04119*** | (2016.01) |

(52) U.S. Cl.

CPC .................. *D01D 5/24* (2013.01); *C08J 9/28* (2013.01); *C08L 71/12* (2013.01); *D01D 5/06* (2013.01); *D01F 1/08* (2013.01); *H01M 8/04149* (2013.01); *C08J 2371/12* (2013.01); *D10B 2331/06* (2013.01); *D10B 2505/00* (2013.01)

(58) Field of Classification Search

CPC ........ D01D 5/24; D01F 1/08; D10B 2331/06; H01M 8/04149; C08J 2471/08–12; C08J 9/28; C08J 2371/08–12; C08L 71/08–12

See application file for complete search history.

(56) References Cited

U.S. PATENT DOCUMENTS

| | | | | |
|---|---|---|---|---|
| 2005/0159562 | A1* | 7/2005 | Hayashi ................ | C08G 65/48 525/534 |
| 2010/0107880 | A1 | 5/2010 | Sekiguchi | |
| 2013/0306544 | A1 | 11/2013 | Ueno et al. | |
| 2017/0050148 | A1 | 2/2017 | Taniguchi | |

* cited by examiner

*Primary Examiner* — Kregg T Brooks

(74) *Attorney, Agent, or Firm* — Hemisphere Law, PLLC

(57) ABSTRACT

The present invention discloses a hollow fiber membrane material for a high-humidification hydrogen fuel cell humidifier and a preparation method and application thereof, and belongs to the technical field of fuel cell materials. The present invention provides a hollow fiber membrane material, and the preparation method includes: mixing and dissolving sulfonated polyarylene ether nitrile resin, a pore-forming agent, a modified nano-filler and a solvent for still standing; performing vacuumizing; coagulating a spinning fluid in an internal coagulant bath and an external coagulant bath; and washing and drying an obtained crude product to obtain the hollow fiber membrane material.

8 Claims, 2 Drawing Sheets

HOLLOW FIBER MEMBRANE MATERIAL FOR HIGH-HUMIDIFICATION HYDROGEN FUEL CELL HUMIDIFIER AND PREPARATION METHOD AND APPLICATION THEREOF

CROSS REFERENCE TO RELATED APPLICATION

This patent application claims the benefit and priority of Chinese Patent Application No. 2022106838958 filed on Jun. 16, 2022, the disclosure of which is incorporated by reference herein in its entirety as part of the present application.

TECHNICAL FIELD

The present invention belongs to the technical field of fuel cell materials, and particularly relates to a hollow fiber membrane material for a high-humidification hydrogen fuel cell humidifier and a preparation method and application thereof.

BACKGROUND

The commercialization process of a hydrogen fuel cell as a novel pollution-free and high-efficiency power source is accelerating in recent years with the strong support of policies, in order to further achieve a goal of carbon peak and carbon neutralization. A working principle of the hydrogen fuel cell is as follows: hydrogen enters a cell body, and is disassociated into hydrogen protons and electrons in an anode catalytic layer; and the hydrogen protons pass through a proton exchange membrane in a form of hydrated protons, and are bonded to oxygen ions at a cathode catalytic layer to produce water. As long as hydrogen and oxygen are supplied, the fuel cell can continuously generate electricity, and discharged gas is pollution-free wet air.

Although the hydrogen fuel cell has many advantages, the actual working process is limited by many conditions. For example, during the use of the hydrogen fuel cell, water in the cell has a great effect on the use process. If there is too much water in the hydrogen fuel cell, an interior of a flow channel of the cell is easily blocked, thereby reducing the uniformity of air distribution, and weakening the performance of the cell. If there is too little water in the hydrogen fuel cell, the hydrogen fuel cell may be dried up, and the proton conductivity drops sharply, resulting in remarkable decrease in the performance of a cell stack. Therefore, it is necessary to manage water for the hydrogen fuel cell, so as to ensure the water content of a proton exchange membrane of the hydrogen fuel cell. Among various methods for keeping the water content of the hydrogen fuel cell, external humidification is the most common and simplest method.

An external humidifier technology uses an external humidifier independent of a battery pack, to humidify the battery pack before reaction air enters the battery pack. The external humidifier technology has the characteristics of easiness in control, large amount of humidification and convenience in mounting and maintenance, and is often used in a fuel cell humidification system. So far, the commonly used external humidification technologies mainly include a bubbling humidifier, a water spray humidifier, an enthalpy wheel humidifier and a hollow fiber membrane humidifier. The previous external humidification technologies are not suitable for vehicle fuel cells due to their more or less disadvantages. At present, a method of humidifying air entering the cell stack of the vehicle fuel cell mainly uses the hollow fiber membrane humidification method.

Application of the hollow fiber membrane humidifier in a proton exchange membrane fuel cell system humidifies cathode air before the cathode air enters the stack, and an air/air humidification mode further makes full use of water and heat in exhaust air without additional power consumption of the stack. For a high-power hydrogen fuel cell vehicle, due to a narrow interior space of the vehicle, it requires to minimize a volume of the hydrogen fuel cell system, and to reduce a volume of the hydrogen fuel cell humidifier correspondingly. This requires that the hydrogen fuel cell humidifier has excellent performance, that is, has better performance with a small volume.

Nowadays, the hollow fiber membrane material commonly used in the fuel cell system is mainly Nafion perfluorosulfonic-acid membrane produced by DuPont Company in the United States, but its high price cost, environmental problems due to fluorine-containing materials and the like are difficult to be solved. In addition, hollow fiber tubes on the market are faced with various disadvantages such as poor heat resistance, high wire breaking rate, low generated power, and poor humidification performance. Especially under the condition of high air flow, the humidification performance is poor; a pressure drop on a ventilation side of a pipeline is large; a pressure bearing capacity of the hollow fiber membrane is not strong; and after long-term use, the membrane is easy to break to cause air leakage. These limit the use of the hollow fiber tubes as the fuel cell humidifiers.

SUMMARY

Aiming to the problems in the prior art, starting from the source of a hollow fiber membrane material, the present invention synthesizes unique sulfonated polyarylene ether nitrile resin through design of a molecular structure, and optimizes a processing and forming process of the hollow fiber membrane through coordination with a formulation. Finally, the obtained hollow fiber membrane material is assembled into a humidifier to ensure stable operation of a hydrogen fuel cell stack.

The present invention firstly provides a preparation method for a hollow fiber membrane material for a high-humidification hydrogen fuel cell humidifier, including the following steps:

Mixing and fully dissolving sulfonated polyarylene ether nitrile resin, a pore-forming agent, a modified nano-filler and a solvent for still standing; performing vacuumizing to obtain a spinning fluid; coagulating the spinning fluid in an internal coagulant bath to obtain as-spun fibers; coagulating the as-spun fibers in an external coagulant bath to obtain a crude hollow fiber product; and washing and drying the crude product to obtain the hollow fiber membrane material for the hydrogen fuel cell humidifier, wherein the internal coagulant bath is water; the external coagulant bath is an aqueous hydrochloric acid solution; the sulfonated polyarylene ether nitrile resin has the structure as follows:

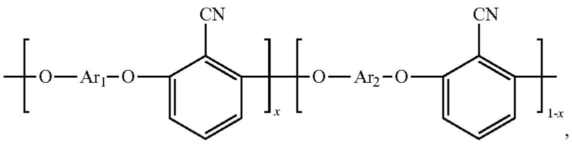

, wherein —$Ar_1$— includes:

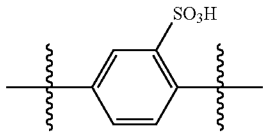

or

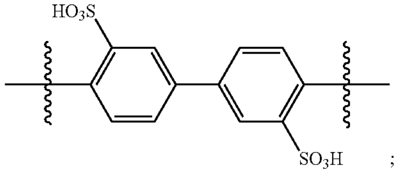

;

—$Ar_2$— includes:

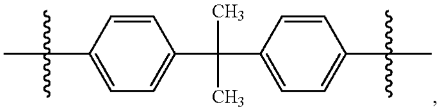

,

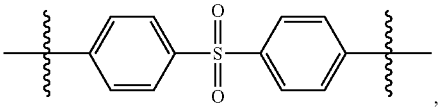

,

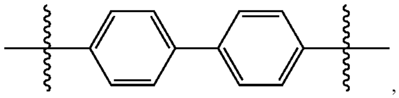

,

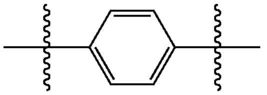

or

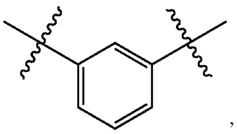

, and 0<x<0.5.

In the above preparation method for the hollow fiber membrane material for the high-humidification hydrogen fuel cell humidifier, the pore-forming agent is at least one of polyethylene glycol, ethanol, ethylene glycol, diethylene glycol, polyvinylpyrrolidone, a block polymer of polyoxyethylene ether and polyoxypropylene ether, methanol, n-propanol, isopropanol and glycerol.

In the above preparation method for the hollow fiber membrane material for the high-humidification hydrogen fuel cell humidifier, the solvent is at least one of NMP, DMF, DMAc and DMSO.

In the above preparation method for the hollow fiber membrane material for the high-humidification hydrogen fuel cell humidifier, the modified nano-filler is at least one of nano-calcium oxide, nano-zinc oxide, nano-titanium dioxide, nano-silica, nano-zirconia, nano-cerium dioxide and nano-silicon carbide.

In the above preparation method for the hollow fiber membrane material for the high-humidification hydrogen fuel cell humidifier, a mass ratio of the sulfonated polyarylene ether nitrile resin, the pore-forming agent and the modified nano-filler is (16-30):(3-8):(0.5-5).

In the above preparation method for the hollow fiber membrane material for the high-humidification hydrogen fuel cell humidifier, a ratio of a mass of the sulfonated polyarylene ether nitrile resin to a volume of the solvent is 15-50%.

In the above preparation method for the hollow fiber membrane material for the high-humidification hydrogen fuel cell humidifier, a temperature of dissolution is 30-150° C.

In the above preparation method for the hollow fiber membrane material for the high-humidification hydrogen fuel cell humidifier, time for still standing is 12-72 h.

In the above preparation method for the hollow fiber membrane material for the high-humidification hydrogen fuel cell humidifier, a mass concentration of the aqueous hydrochloric acid solution is 5-30%.

In the above preparation method for the hollow fiber membrane material for the high-humidification hydrogen fuel cell humidifier, a temperature of the external coagulant bath is 30-70° C.

In the above preparation method for the hollow fiber membrane material for the high-humidification hydrogen fuel cell humidifier, a temperature of washing is 40-60° C.; and water boiling is performed for 12-72 h.

In the above preparation method for the hollow fiber membrane material for the high-humidification hydrogen fuel cell humidifier, the sulfonated polyarylene ether nitrile resin is prepared by the following method:

S1, mixing and fully dissolving inorganic alkali, diphenol and an organic mixed solvent;

S2, then adding 2,6-difluorobenzonitrile, and performing heating reflux;

S3, separating water, and gradually raising a temperature of a system to 160-170° C. for a continued reaction;

S4, releasing toluene, raising the temperature of the system to 180-200° C., and stopping the reaction if a viscosity does not change;

S5, soaking a product after the reaction into acetone, filtering and crushing the product, then continuing to wash the product with the acetone, and finally, cleaning the product with an aqueous hydrochloric acid solution and water in sequence to obtain the sulfonated polyarylene ether nitrile resin.

In the above preparation method for the hollow fiber membrane material for the high-humidification hydrogen fuel cell humidifier, in preparing the sulfonated polyarylene ether nitrile resin, a molar ratio of the diphenol, the 2,6-difluorobenzonitrile and the inorganic alkali is 1:(1-1.01):(1-1.5).

In the above preparation method for the hollow fiber membrane material for the high-humidification hydrogen fuel cell humidifier, in preparing the sulfonated polyarylene ether nitrile resin, the organic mixed solvent is a mixed solvent of at least one of NMP, DMAc, sulfolane, diphenyl sulfone and DMF and the toluene; and a volume ratio of one of NMP, DMAc, the sulfolane, the diphenyl sulfone and DMF to the toluene is (4-2.5):1.

In the above preparation method for the hollow fiber membrane material for the high-humidification hydrogen fuel cell humidifier, in preparing the sulfonated polyarylene ether nitrile resin, the inorganic alkali is at least one of $Na_2CO_3$, $K_2CO_3$, KF, $NaHCO_3$ and $KHCO_3$.

In the above preparation method for the hollow fiber membrane material for the high-humidification hydrogen fuel cell humidifier, in preparing the sulfonated polyarylene ether nitrile resin, a ratio of a total mass of the diphenol, the 2,6-difluorobenzonitrile and the inorganic alkali to a total volume of the organic mixed solvent is 60-90%.

In the above preparation method for the hollow fiber membrane material for the high-humidification hydrogen fuel cell humidifier, in preparing the sulfonated polyarylene ether nitrile resin, in step S2, a temperature of heating reflux is 140-145° C.

In the above preparation method for the hollow fiber membrane material for the high-humidification hydrogen fuel cell humidifier, in preparing the sulfonated polyarylene ether nitrile resin, in step S2, time for heating reflux is 2.5-3 h.

In the above preparation method for the hollow fiber membrane material for the high-humidification hydrogen fuel cell humidifier, in preparing the sulfonated polyarylene ether nitrile resin, in step S3, the continued reaction is performed for 1-2 h.

In the above preparation method for the hollow fiber membrane material for the high-humidification hydrogen fuel cell humidifier, the modified nano-filler is prepared by the following method:

mixing a nano-filler with an ethanol aqueous solution, and ultrasonically dispersing a mixture to obtain a nano-solution; mixing a silane coupling agent with the ethanol aqueous solution for stirring and heating, and adjusting a pH value of a mixture to 3-5 to obtain a coupling agent solution; and mixing the nano-solution with the coupling agent solution for reaction, and then performing post-treatment on a resultant to obtain the modified nano-filler.

In the above preparation method for the hollow fiber membrane material for the high-humidification hydrogen fuel cell humidifier, in preparing the modified nano-filler, a concentration of the ethanol aqueous solution is 70-95%.

In the above preparation method for the hollow fiber membrane material for the high-humidification hydrogen fuel cell humidifier, in preparing the modified nano-filler, time for ultrasonic dispersion is 1-3 h.

In the above preparation method for the hollow fiber membrane material for the high-humidification hydrogen fuel cell humidifier, in preparing the modified nano-filler, the silane coupling agent is at least one of KH550, KH560, KH570, KH792 and DL602.

In the above preparation method for the hollow fiber membrane material for the high-humidification hydrogen fuel cell humidifier, in preparing the modified nano-filler, a mass of the silane coupling agent is 5-30% of that of the nano-filler.

In the above preparation method for the hollow fiber membrane material for the high-humidification hydrogen fuel cell humidifier, in preparing the modified nano-filler, time for stirring and heating is 2-5 h.

In the above preparation method for the hollow fiber membrane material for the high-humidification hydrogen fuel cell humidifier, in preparing the modified nano-filler, the pH value is adjusted using the aqueous hydrochloric acid solution.

In the above preparation method for the hollow fiber membrane material for the high-humidification hydrogen fuel cell humidifier, in preparing the modified nano-filler, a temperature of the obtained coupling agent solution is controlled at 50-80° C.

In the above preparation method for the hollow fiber membrane material for the high-humidification hydrogen fuel cell humidifier, in preparing the modified nano-filler, a ratio of a total mass of the nano-filler and the silane coupling agent to a total volume of the ethanol aqueous solution is 1:(50-200).

In the above preparation method for the hollow fiber membrane material for the high-humidification hydrogen fuel cell humidifier, in preparing the modified nano-filler, a mixing mode of the nano-solution and the coupling agent solution is to add the nano-solution to the coupling agent solution dropwise.

In the above preparation method for the hollow fiber membrane material for the high-humidification hydrogen fuel cell humidifier, in preparing the modified nano-filler, time for the reaction is 8-12 h.

The present invention further provides a hollow fiber membrane material for a high-humidification hydrogen fuel cell humidifier prepared using the above preparation method, which has a tube external diameter of 1000-2000 um, a thickness of a tube wall of 100-250 um and a tensile strength of 6-15 MPa; and suitable tube diameter and thickness as well as excellent mechanical properties of the material can remarkably improve the humidification performance.

The present invention further provides application of the hollow fiber membrane material for the high-humidification hydrogen fuel cell humidifier in a fuel cell humidifier; the prepared hollow fiber membrane is cut as required, and charged in a humidifier; and two ends of the humidifier are sealed with waterborne epoxy glue, to assemble the humidifier.

It should be noted that, in the present invention, for the ratio of the mass to the volume, the mass and the volume are compared in a unit at a same grade.

The present invention has the beneficial effects:

In the present invention, through the design of the molecular structure, the sulfonated polyarylene ether nitrile resin with a controllable sulfonation degree is developed independently; the side-chain cyano group improves the processability of the resin; and an intermolecular hydrogen bond formed by the sulfonated polyarylene ether nitrile resin makes the final hollow fiber membrane have excellent mechanical properties, low wire breaking rate and excellent humidification performance. Meanwhile, through optimization by coordinating with the formulation, the modified nano-filler is used to ensure the uniform water retention capacity of the hollow fiber tube; and through optimization on a processing and molding process of the hollow fiber membrane, the hollow fiber membrane is successfully formed with a stable size by combined formation with the internal coagulant bath and the external coagulant bath, so that after the finally obtained hollow fiber membrane material is applied to the hydrogen fuel cell humidifier, the hydrogen fuel cell humidifier is of a stable structure, and can withstand a large pressure difference without easily breaking and causing air leakage in the cell, which prolongs the service life of the humidifier. The sulfonated polyarylene ether nitrile resin increases the system dynamic response speed of the hydrogen fuel cell humidifier and achieves accurate control on the humidification amount. Therefore, the present invention has broad application prospects.

DETAILED DESCRIPTION

Figure 1:
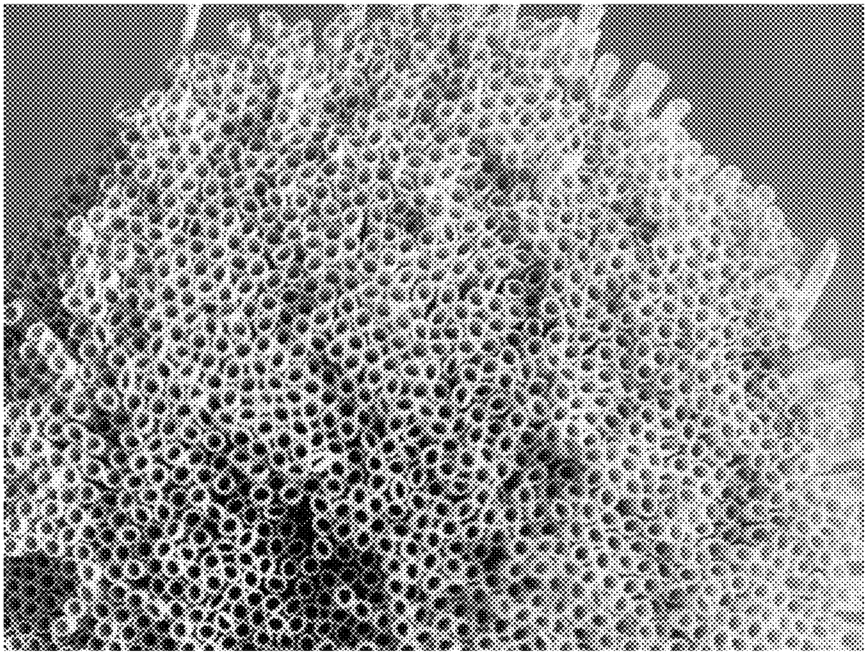
FIG. 1 is an actual view of a hollow structure of a hollow fiber membrane material of the present invention.
Figure 2:
FIG. 2 is an actual view of a hollow fiber membrane material of the present invention.

Specifically, a preparation method for a hollow fiber membrane material for a high-humidification hydrogen fuel cell humidifier includes the following steps:

Mixing and fully dissolving sulfonated polyarylene ether nitrile resin, a pore-forming agent, a modified nano-filler and a solvent for still standing; performing vacuumizing (to remove residual bubbles from a solution) to obtain a spinning fluid; coagulating the spinning fluid in an internal coagulant bath to obtain as-spun fibers; coagulating the as-spun fibers in an external coagulant bath to obtain a crude hollow fiber product; and washing and drying the crude product to obtain the hollow fiber membrane material for the hydrogen fuel cell humidifier, wherein the internal coagulant bath is water; and the external coagulant bath is an aqueous hydrochloric acid solution.

In the present invention, when the spinning fluid is formed into hollow fibers through the coagulant baths, water is first used as the internal coagulant bath, to make the fibers preliminarily formed; forming time with the internal coagulant bath is generally shorter; and then the as-spun fibers are soaked into the external coagulant bath for further forming. In the art, the hollow fiber membrane material is generally prepared in a spinning device. For example, in the embodiments of the present invention, the spinning fluid is stored in a liquid tank, and then the spinning fluid in the liquid tank is metered into an annular gap of a spinneret through a metering pump at a pressure of about 1-3 atmospheres; and meanwhile, the internal coagulant bath enters an insertion tube of the spinneret through a peristaltic pump (the internal coagulant bath is equivalent to liquid inside the hollow fiber tube), then the as-spun fibers directly enter an external coagulation tank for coagulation, and finally, the hollow fiber membrane is collected through a rotary drum.

The present invention adopts combined formation with the internal coagulant bath and the external coagulant bath. In the forming process, the product is preliminarily formed through the internal coagulant bath, and then is directly formed through the external coagulant bath without using the air, which is beneficial to ensuring the size stability of the hollow fiber membrane and making the size of the hollow fiber membrane suitable.

The present invention designs the molecular structure; and the structure of the sulfonated polyarylene ether nitrile resin is as follows:

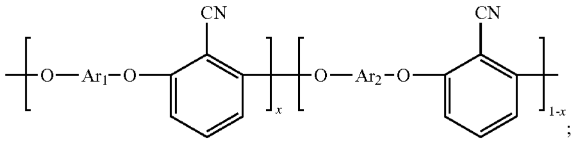

;

wherein, $0<x<0.5$; —$Ar_1$— includes:

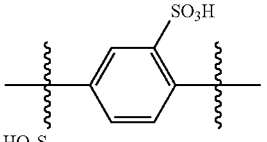

or

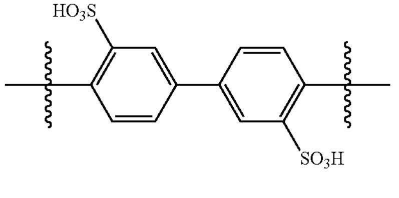

;

and —$Ar_2$— includes:

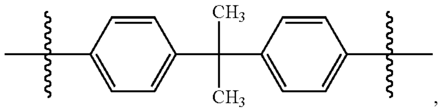

,

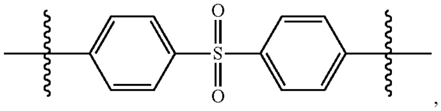

,

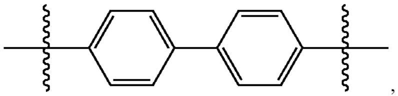

,

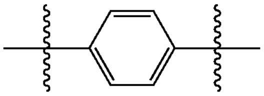

or

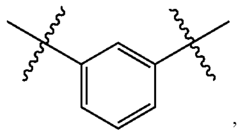

,

In the present invention, through the design of the molecular structure, the sulfonated polyarylene ether nitrile resin with a controllable sulfonation degree is developed independently, wherein —$Ar_1$— and —$Ar_2$— are from diphenol raw materials; and a ratio of —$Ar_1$— to —$Ar_2$— is controlled by controlling addition amounts of different diphenols. Through a test, in the sulfonated polyarylene ether nitrile resin, it should be controlled that $0<x<0.5$, and the structures of —$Ar_1$— and —$Ar_2$— (—$Ar_2$— cannot contain a sulfonic acid group) should be controlled at the same time, so as to prevent an excessive content of a sulfonic acid unit from causing too serious water absorption, and in turn making the hollow fiber tube not formed.

In the present invention, the pore-forming agent is at least one of polyethylene glycol, ethanol, ethylene glycol, diethylene glycol, polyvinylpyrrolidone, a block polymer of polyoxyethylene ether and polyoxypropylene ether, methanol, n-propanol, isopropanol and glycerol.

In the present invention, the solvent is at least one of NMP, DMF, DMAc and DMSO. In the present invention, the modified nano-filler is at least one of nano-calcium oxide, nano-zinc oxide, nano-titanium dioxide, nano-silica, nano-zirconia, nano-cerium dioxide and nano-silicon carbide. With the use of the modified nano-filler, on the one hand, the dispersibility of the filler in the solution is optimized, and the uniformity of the hollow fiber tube is ensured; and on the other hand, the nano-hydrophilic filler can improve the water retention capacity of the hollow fiber tube, thereby improving the humidification ability. However, too many filler can aggregate, which affects the performance. Therefore, in the present invention, a mass ratio of the sulfonated polyarylene ether nitrile resin, the pore-forming agent and the modified nano-filler is (16-30):(3-8):(0.5-5).

In the present invention, a ratio of a mass of the sulfonated polyarylene ether nitrile resin to a volume of the solvent is 15-50%.

In the present invention, a temperature of dissolution is 30-150° C.; and time for still standing is 12-72 h.

In the present invention, the external coagulant bath adopts an aqueous hydrochloric acid solution with a mass concentration of 5-30%, so as to ensure formation of the hollow fiber tube. If water is used directly, it is difficult in formation.

In the present invention, a temperature of the external coagulant bath is 30-70° C.

In the present invention, after being formed, the hollow fiber membrane material is boiled in water at 40-60° C. for 12-72 h, so as to remove the residual solvent.

In the present invention, the sulfonated polyarylene ether nitrile resin is prepared by the following method:

S1, mixing and fully dissolving inorganic alkali, diphenol and an organic mixed solvent;

S2, then adding 2,6-difluorobenzonitrile, and performing heating reflux;

S3, separating water, and gradually raising a temperature of a system to 160-170° C. for a continued reaction;

S4, releasing toluene, raising the temperature of the system to 180-200° C., and stopping the reaction if a viscosity does not change;

S5, soaking a product after the reaction into acetone, filtering and crushing the product, then continuing to wash the product with the acetone, and finally, cleaning the product with an aqueous hydrochloric acid solution and water in sequence to obtain the sulfonated polyarylene ether nitrile resin.

In the present invention, in preparing the sulfonated polyarylene ether nitrile resin, a molar ratio of the diphenol, the 2,6-difluorobenzonitrile and the inorganic alkali is 1:(1-1.01):(1-1.5).

In the present invention, in preparing the sulfonated polyarylene ether nitrile resin, the organic mixed solvent is a mixed solvent of at least one of NMP, DMAc, sulfolane, diphenyl sulfone and DMF and the toluene; and a volume ratio of one of NMP, DMAc, the sulfolane, the diphenyl sulfone and DMF to the toluene is (4-2.5):1.

In the present invention, in preparing the sulfonated polyarylene ether nitrile resin, the inorganic alkali is at least one of $Na_2CO_3$, $K_2CO_3$, KF, $NaHCO_3$ and $KHCO_3$.

In the present invention, in preparing the sulfonated polyarylene ether nitrile resin, a ratio of a total mass of the diphenol, the 2,6-difluorobenzonitrile and the inorganic alkali to a total volume of the organic mixed solvent is 60-90%.

In the present invention, in preparing the sulfonated polyarylene ether nitrile resin, in step S2, the reaction system is subjected to heating reflux for 2.5-3 h at a temperature of 140-145° C. for dehydration.

In the present invention, in preparing the sulfonated polyarylene ether nitrile resin, in step S3, water produced by the reaction is released through a water separator; at this time, a toluene content in the system is reduced synchronously, resulting in a gradual increase in temperature; the heating process generally lasts for 1-2 h, and the system is finally heated to 160-170° C.; and at this time, the reaction id continued for 1-2 h, so that the material is gradually subjected to condensation polymerization.

In the present invention, in preparing the sulfonated polyarylene ether nitrile resin, in step S4, as a dehydrating agent, the toluene does not exert the effect after the water is fully removed, and thus the toluene needs to be removed. In the process of releasing the toluene, the temperature of the system may be continued to rise, and eventually rise to 180-200° C.

In the present invention, in preparing the sulfonated polyarylene ether nitrile resin, in step S5, due to high water absorption of the sulfonic acid group, a polymerization product cannot be directly poured into the ethanol or an aqueous solution at a high temperature, otherwise the resin may swell to make the product scrapped. In the present invention, aiming to the characteristics of sulfonated polyarylene ether nitrile, a hot solution after the reaction is directly poured into the acetone, and subsequently subjected to post-treatment with the acetone, the aqueous hydrochloric acid solution and the water at room temperature; a product (not cooled) after the reaction is poured into the acetone first for soaking for 12-24 h at the room temperature, and filtered and crushed; subsequently, the acetone is continued to be added, and unreacted small molecules are washed away with stirring; and then, a resultant is cleaned with the aqueous hydrochloric acid solution for 2-3 times, and then with the water for 2-3 times to remove excess inorganic alkali. Therefore, the sulfonated polyarylene ether nitrile resin which can be used for preparing the hollow fiber membrane material can be successfully obtained.

In the present invention, the modified nano-filler is prepared by the following method:

mixing a nano-filler with an ethanol aqueous solution, and ultrasonically dispersing a mixture to obtain a nano-solution; mixing a silane coupling agent with the ethanol aqueous solution for stirring and heating, and adjusting a pH value of a mixture to 3-5 to obtain a coupling agent solution; and mixing the nano-solution with the coupling agent solution for reaction, and then performing post-treatment on a resultant to obtain the modified nano-filler.

In the present invention, in preparing the modified nano-filler, the ethanol aqueous solution with a volume concentration of 70-95% is used to disperse the nano-filler or dissolve the silane coupling agent; and the concentration of the ethanol aqueous solution is controlled to make the system contain sufficient water, thereby ensuring a subsequent hydrolytic crosslinking reaction.

In the present invention, in preparing the modified nano-filler, time for ultrasonic dispersion is 1-3 h.

In the present invention, in preparing the modified nano-filler, the silane coupling agent is at least one of KH550, KH560, KH570, KH792 and DL602.

In the present invention, in preparing the modified nano-filler, a mass of the silane coupling agent is 5-30% of that of the nano-filler.

In the present invention, in preparing the modified nano-filler, time for stirring and heating is 2-5 h.

In the present invention, in preparing the modified nano-filler, the pH value is adjusted using the aqueous hydrochloric acid solution.

In the present invention, in preparing the modified nano-filler, a temperature of the obtained coupling agent solution is controlled at 50-80° C.

In the present invention, in preparing the modified nano-filler, there is a need for controlling a ratio of the total mass of the nano-filler and the silane coupling agent to the total volume of the ethanol aqueous solution at 1:(50-200), so as to ensure the hydrolytic crosslinking reaction to be performed. However, there is no need for strictly controlling respective use amounts of the ethanol aqueous solution in which the nano-filler is dispersed and the ethanol aqueous solution into which the silane coupling agent is dissolved, only needing to ensure good dispersion of the nano-solution (which should be in a slurry state actually) and full dissolution of the silane coupling agent. The total volume of the ethanol aqueous solution meets the requirements, regardless of more former or less latter.

In the present invention, in preparing the modified nano-filler, a mixing mode of the nano-solution and the coupling agent solution is to add the nano-solution to the coupling agent solution dropwise.

In the present invention, in preparing the modified nano-filler, time for the reaction is 8-12 h.

The present invention further provides a hollow fiber membrane material for a high-humidification hydrogen fuel cell humidifier prepared using the above preparation method, which has a tube external diameter of 1000-2000 um, a thickness of a tube wall of 100-250 um and a tensile strength of 6-15 MPa. Through a test, only controlling the tube diameter, the thickness and the mechanical properties of the hollow fiber membrane material under this condition can ensure excellent humidification performance of the hollow fiber membrane material. If the hollow fiber membrane material is thicker, the humidification performance may be weakened; and if the hollow fiber membrane material is thinner, it is not enough to bear a pressure difference during operation.

The present invention further provides application of the hollow fiber membrane material for the high-humidification hydrogen fuel cell humidifier in a fuel cell humidifier; the prepared hollow fiber membrane is cut as required, and charged in a humidifier; and two ends of the humidifier are sealed with waterborne epoxy glue, to assemble the humidifier.

Especially for a proton exchange membrane fuel cell with a high power stack, due to difficulty in replacement, a limited storage space of the fuel cell and other reasons, a fuel cell system is required to have a longer service life and a smaller volume; and correspondingly, the humidification system is required to improve the weather resistance and the humidification performance per unit volume. The hollow fiber membrane material designed by the present invention has excellent performance, completely meets the requirements, and thus is especially suitable for application to the proton exchange membrane fuel cell.

The present invention is further described below in detail through embodiments, but the protection scope of the present invention is not limited to the scope of the embodiments.

Embodiment 1

Step 1 (synthesis of sulfonated polyarylene ether nitrile resin): adding potassium carbonate (a molar ratio of potassium carbonate to 2,6-difluorobenzonitrile is 1.5:1) and diphenol (a molar ratio of potassium 2,5-dihydroxybenzenesulfonate to biphenol is 4:6) to NMP and toluene in sequence (a ratio of the total mass of diphenol, 2,6-difluorobenzonitrile and potassium carbonate to the total volume of NMP and toluene solvent is 90%, and a volume ratio of NMP to toluene is 3:1), and fully dissolving; then adding 2,6-difluorobenzonitrile (a molar ratio of 2,6-difluorobenzonitrile to diphenol is 1:1) and heating to 140° C. for refluxing for 3 h; releasing water and toluene; raising the temperature gradually to 165° C., and conducting continued reaction for at least one hour; continuously and slowly releasing the toluene solution, raising the temperature to 190° C., and stopping the reaction if a viscosity does not change; pouring a product after the reaction into the acetone solution, soaking at room temperature for 12 h; filtering and crushing the product; then continuing to adding the acetone solution; stirring to wash away unreacted small molecules; then cleaning the product with an aqueous hydrochloric acid solution and water in sequence for 3 times to remove excess potassium carbonate; and filtering and drying to obtain the sulfonated polyarylene ether nitrile with a structural formula as follows:

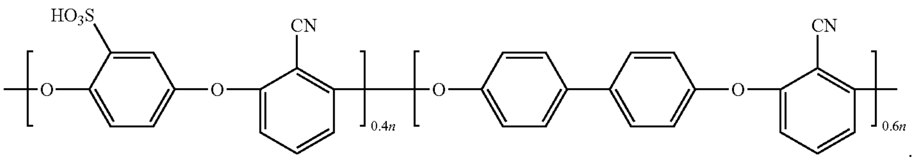

Step 2 (synthesis of additive): weighing nano-silica and dispersing in 95% ethanol; performing ultrasonic dispersion for 1-3 h; meanwhile, adding KH560 (the mass of KH560 is 10% of the mass of nano-silica) to 95% ethanol (the ratio of the total mass of nano-silica and KH560 to the total volume of an ethanol aqueous solution is 1:50), stirring and heating for 3 h; controlling the temperature of the solution as 80° C. and pH value as about 5; slowly adding the above dispersed nano-solution; and after reaction for 12 h, performing suction filtration, washing, drying and grinding for later use;

Step 3 (preparation of hollow fiber tube): fully stirring and dissolving the sulfonated polyarylene ether nitrile resin, polyethylene glycol, additive (a mass ratio of the sulfonated polyarylene ether nitrile resin, polyethylene glycol and additive is 25:3:2) and DMF (a ratio of the mass of the sulfonated polyarylene ether nitrile resin to the volume of DMF is 25%) in a liquid tank of spinning fluid at 90° C., still standing for 72 h, and vacuumizing to remove the residual bubbles in the solution; then metering the spinning fluid in the liquid tank into an annular gap of a spinneret through a metering pump at a pressure of about 1 atmosphere; and meanwhile, making the internal coagulant bath water enter an insertion tube of the spinneret through a peristaltic pump, making the as-spun fibers directly enter an external coagulation tank of 10% aqueous hydrochloric acid solution at 30° C. for coagulation, and finally, collecting the hollow fiber membrane through a rotary drum; boiling the prepared hollow fiber membrane in water at 40° C. for 24 h to remove the residual solvent; and drying to obtain the hollow fiber tube for a hydrogen fuel cell humidifier.

The prepared hollow fiber membrane is cut as required, and charged in a 5 kw humidifier; and two ends are sealed with waterborne epoxy glue, to assemble the humidifier.

Embodiment 2

Step 1 (synthesis of sulfonated polyarylene ether nitrile resin): adding potassium carbonate (a molar ratio of potassium carbonate to 2,6-difluorobenzonitrile is 1.5:1) and diphenol (a molar ratio of potassium 2,5-dihydroxybenzenesulfonate to biphenol is 3:7) to NMP and toluene in sequence (a ratio of the total mass of diphenol, 2,6-difluorobenzonitrile and potassium carbonate to the total volume of NMP and toluene solvent is 80%, and a volume ratio of NMP to toluene is 3:1), and fully dissolving; then adding 2,6-difluorobenzonitrile (a molar ratio of 2,6-difluorobenzonitrile to diphenol is 1:1) and heating to 140° C. for refluxing for 3 h; releasing water and toluene; raising the temperature gradually to 165° C., and conducting continued reaction for at least one hour; continuously and slowly releasing the toluene solution, raising the temperature to 190° C., and stopping the reaction if a viscosity does not change; pouring a product after the reaction into the acetone solution, soaking at room temperature for 12 h; filtering and crushing the product; then continuing to adding the acetone solution; stirring to wash away unreacted small molecules; then cleaning the product with an aqueous hydrochloric acid solution and water in sequence for 3 times to remove excess potassium carbonate; and filtering and drying to obtain the sulfonated polyarylene ether nitrile with a structural formula as follows:

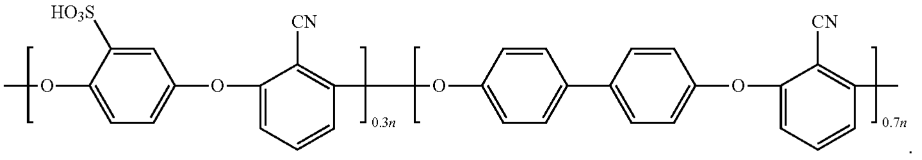

Step 2 (synthesis of additive): weighing nano-silica and dispersing in 95% ethanol; performing ultrasonic dispersion for 1-3 h; meanwhile, adding KH560 (the mass of KH560 is 10% of the mass of nano-silica) to 95% ethanol (the ratio of the total mass of nano-silica and KH560 to the total volume of an ethanol aqueous solution is 1:50), stirring and heating for 3 h; controlling the temperature of the solution as 80° C. and pH value as about 5; slowly adding the above dispersed nano-solution; and after reaction for 12 h, performing suction filtration, washing, drying and grinding for later use;

Step 3 (preparation of hollow fiber tube): fully stirring and dissolving the sulfonated polyarylene ether nitrile resin, polyethylene glycol, additive (a mass ratio of the sulfonated polyarylene ether nitrile resin, polyethylene glycol and additive is 22:5:2) and DMF (a ratio of the mass of the sulfonated polyarylene ether nitrile resin to the volume of DMF is 22%) in a liquid tank of spinning fluid at 90° C., still standing for 72 h, and vacuumizing to remove the residual bubbles in the solution; then metering the spinning fluid in the liquid tank into an annular gap of a spinneret through a metering pump at a pressure of about 1 atmosphere; and meanwhile, making the internal coagulant bath water enter an insertion tube of the spinneret through a peristaltic pump, making the as-spun fibers directly enter an external coagulation tank of 10% aqueous hydrochloric acid solution at 50° C. for coagulation, and finally, collecting the hollow fiber membrane through a rotary drum; boiling the prepared hollow fiber membrane in water at 40° C. for 24 h to remove the residual solvent; and drying to obtain the hollow fiber tube for a hydrogen fuel cell humidifier.

The prepared hollow fiber membrane is cut as required, and charged in a 5 kw humidifier; and two ends are sealed with waterborne epoxy glue, to assemble the humidifier.

Embodiment 3

Step 1 (synthesis of sulfonated polyarylene ether nitrile resin): adding potassium carbonate (a molar ratio of potassium carbonate to 2,6-difluorobenzonitrile is 1.5:1) and diphenol (a molar ratio of potassium 2,5-dihydroxybenzenesulfonate to biphenol is 2:8) to NMP and toluene in sequence (a ratio of the total mass of diphenol, 2,6-difluorobenzonitrile and potassium carbonate to the total volume of NMP and toluene solvent is 80%, and a volume ratio of NMP to toluene is 3:1), and fully dissolving; then adding 2,6-difluorobenzonitrile (a molar ratio of 2,6-difluorobenzonitrile to diphenol is 1:1) and heating to 140° C. for refluxing for 3 h; releasing water and toluene; raising the temperature gradually to 165° C., and conducting continued reaction for at least one hour; continuously and slowly releasing the toluene solution, raising the temperature to 190° C., and stopping the reaction if a viscosity does not change; pouring a product after the reaction into the acetone solution, soaking at room temperature for 12 h; filtering and crushing the product; then continuing to adding the acetone solution; stirring to wash away unreacted small molecules; then cleaning the product with an aqueous hydrochloric acid solution and water in sequence for 3 times to remove excess potassium carbonate; and filtering and drying to obtain the sulfonated polyarylene ether nitrile with a structural formula as follows:

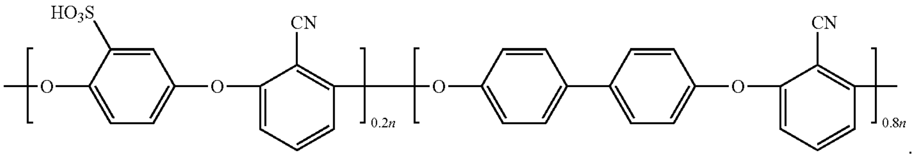

Step 2 (synthesis of additive): weighing nano-silica and dispersing in 95% ethanol; performing ultrasonic dispersion for 1-3 h; meanwhile, adding KH560 (the mass of KH560 is 10% of the mass of nano-silica) to 95% ethanol (the ratio of the total mass of nano-silica and KH560 to the total volume of an ethanol aqueous solution is 1:50), stirring and heating for 3 h; controlling the temperature of the solution as 80° C. and pH value as about 5; slowly adding the above dispersed nano-solution; and after reaction for 12 h, performing suction filtration, washing, drying and grinding for later use;

Step 3 (preparation of hollow fiber tube): fully stirring and dissolving the sulfonated polyarylene ether nitrile resin, polyethylene glycol, additive (a mass ratio of the sulfonated polyarylene ether nitrile resin, polyethylene glycol and additive is 18:5:2) and DMF (a ratio of the mass of the sulfonated polyarylene ether nitrile resin to the volume of DMF is 18%) in a liquid tank of spinning fluid at 90° C., still standing for 72 h, and vacuumizing to remove the residual bubbles in the solution; then metering the spinning fluid in the liquid tank into an annular gap of a spinneret through a metering pump at a pressure of about 1 atmosphere; and meanwhile, making the internal coagulant bath water enter an insertion tube of the spinneret through a peristaltic pump, making the as-spun fibers directly enter an external coagulation tank of 10% aqueous hydrochloric acid solution at 60° C. for coagulation, and finally, collecting the hollow fiber membrane through a rotary drum; boiling the prepared hollow fiber membrane in water at 40° C. for 24 h to remove the residual solvent; and drying to obtain the hollow fiber tube for a hydrogen fuel cell humidifier.

The prepared hollow fiber membrane is cut as required, and charged in a 5 kw humidifier; and two ends are sealed with waterborne epoxy glue, to assemble the humidifier.

Embodiment 4

Step 1 (synthesis of sulfonated polyarylene ether nitrile resin): adding potassium carbonate (a molar ratio of potassium carbonate to 2,6-difluorobenzonitrile is 1.3:1) and diphenol (a molar ratio of potassium 2,5-dihydroxybenzenesulfonate to 4,4'-sulfonyldiphenol is 3:7) to NMP and toluene in sequence (a ratio of the total mass of diphenol, 2,6-difluorobenzonitrile and potassium carbonate to the total volume of NMP and toluene solvent is 80%, and a volume ratio of NMP to toluene is 3:1), and fully dissolving; then adding 2,6-difluorobenzonitrile (a molar ratio of 2,6-difluorobenzonitrile to diphenol is 1.008:1) and heating to 140° C. for refluxing for 3 h; releasing water and toluene; raising the temperature gradually to 165° C., and conducting continued reaction for at least one hour; continuously and slowly releasing the toluene solution, raising the temperature to 190° C., and stopping the reaction if a viscosity does not change; pouring a product after the reaction into the acetone solution, soaking at room temperature for 12 h; filtering and crushing the product; then continuing to adding the acetone solution; stirring to wash away unreacted small molecules; then cleaning the product with an aqueous hydrochloric acid solution and water in sequence for 3 times to remove excess potassium carbonate; and filtering and drying to obtain the sulfonated polyarylene ether nitrile with a structural formula as follows:

nano-solution; and after reaction for 12 h, performing suction filtration, washing, drying and grinding for later use;

Step 3 (preparation of hollow fiber tube): fully stirring and dissolving the sulfonated polyarylene ether nitrile resin, polyvinylpyrrolidone, additive (a mass ratio of the sulfonated polyarylene ether nitrile resin, polyvinylpyrrolidone and additive is 25:3:2) and DMF (a ratio of the mass of the sulfonated polyarylene ether nitrile resin to the volume of DMF is 25%) in a liquid tank of spinning fluid at 100° C., still standing for 36 h, and vacuumizing to remove the residual bubbles in the solution; then metering the spinning fluid in the liquid tank into an annular gap of a spinneret through a metering pump at a pressure of about 1 atmosphere; and meanwhile, making the internal coagulant bath water enter an insertion tube of the spinneret through a peristaltic pump, making the as-spun fibers directly enter an external coagulation tank of 10% aqueous hydrochloric acid solution at 50° C. for coagulation, and finally, collecting the hollow fiber membrane through a rotary drum; boiling the prepared hollow fiber membrane in water at 40° C. for 24 h to remove the residual solvent; and drying to obtain the hollow fiber tube for a hydrogen fuel cell humidifier.

The prepared hollow fiber membrane is cut as required, and charged in a 5 kw humidifier; and two ends are sealed with waterborne epoxy glue, to assemble the humidifier.

Embodiment 5

Step 1 (synthesis of sulfonated polyarylene ether nitrile resin): adding potassium carbonate (a molar ratio of potassium carbonate to 2,6-difluorobenzonitrile is 1.3:1) and diphenol (a molar ratio of potassium 2,5-dihydroxybenzenesulfonate to bisphenol A is 3:7) to NMP and toluene in sequence (a ratio of the total mass of diphenol, 2,6-difluorobenzonitrile and potassium carbonate to the total volume of NMP and toluene solvent is 90%, and a volume ratio of NMP to toluene is 3:1), and fully dissolving; then adding 2,6-difluorobenzonitrile (a molar ratio of 2,6-difluorobenzonitrile to diphenol is 1.005:1) and heating to 140° C. for refluxing for 3 h; releasing water and toluene; raising the temperature gradually to 165° C., and conducting continued reaction for at least one hour; continuously and slowly releasing the toluene solution, raising the temperature to

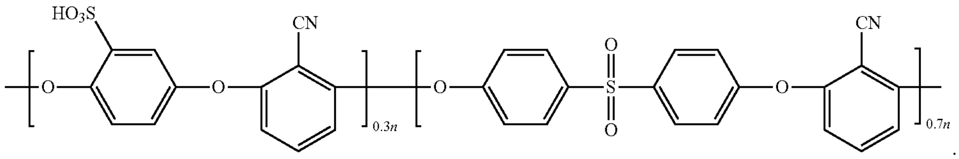

.

Step 2 (synthesis of additive): weighing nano-titanium dioxide and dispersing in 95% ethanol; performing ultrasonic dispersion for 1-3 h; meanwhile, adding KH550 (the mass of KH550 is 10% of the mass of nano-titanium dioxide) to 95% ethanol (the ratio of the total mass of nano-titanium dioxide and KH550 to the total volume of an ethanol aqueous solution is 1:60), stirring and heating for 3 h; controlling the temperature of the solution as 60° C. and pH value as about 5; slowly adding the above dispersed 190° C., and stopping the reaction if a viscosity does not change; pouring a product after the reaction into the acetone solution, soaking at room temperature for 12 h; filtering and crushing the product; then continuing to adding the acetone solution; stirring to wash away unreacted small molecules; then cleaning the product with an aqueous hydrochloric acid solution and water in sequence for 3 times to remove excess potassium carbonate; and filtering and drying to obtain the sulfonated polyarylene ether nitrile with a structural formula as follows:

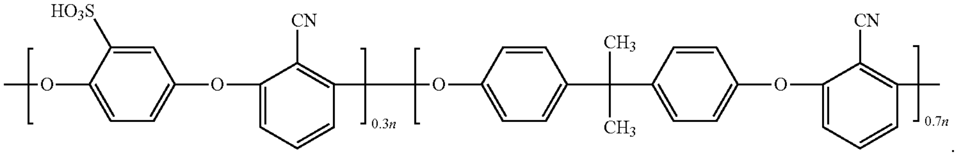

Step 2 (synthesis of additive): weighing nano-titanium dioxide and dispersing in 95% ethanol; performing ultrasonic dispersion for 1-3 h; meanwhile, adding KH560 (the mass of KH560 is 10% of the mass of nano-titanium dioxide) to 95% ethanol (the ratio of the total mass of nano-titanium dioxide and KH560 to the total volume of an ethanol aqueous solution is 1:60), stirring and heating for 3 h; controlling the temperature of the solution as 60° C. and pH value as about 5; slowly adding the above dispersed nano-solution; and after reaction for 12 h, performing suction filtration, washing, drying and grinding for later use;

Step 3 (preparation of hollow fiber tube): fully stirring and dissolving the sulfonated polyarylene ether nitrile resin, polyvinylpyrrolidone, additive (a mass ratio of the sulfonated polyarylene ether nitrile resin, polyvinylpyrrolidone and additive is 30:6:2) and DMF (a ratio of the mass robenzonitrile to diphenol is 1:1) and heating to 140° C. for refluxing for 3 h; releasing water and toluene; raising the temperature gradually to 165° C., and conducting continued reaction for at least one hour; continuously and slowly releasing the toluene solution, raising the temperature to 190° C., and stopping the reaction if a viscosity does not change; pouring a product after the reaction into the acetone solution, soaking at room temperature for 12 h; filtering and crushing the product; then continuing to adding the acetone solution; stirring to wash away unreacted small molecules; then cleaning the product with an aqueous hydrochloric acid solution and water in sequence for 3 times to remove excess potassium carbonate; and filtering and drying to obtain the sulfonated polyarylene ether nitrile with a structural formula as follows:

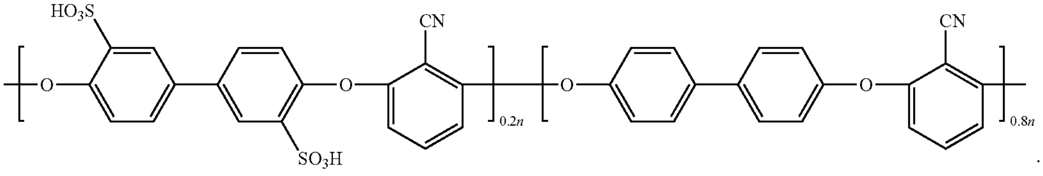

of the sulfonated polyarylene ether nitrile resin to the volume of DMF is 30%) in a liquid tank of spinning fluid at 80° C., still standing for 48 h, and vacuumizing to remove the residual bubbles in the solution; then metering the spinning fluid in the liquid tank into an annular gap of a spinneret through a metering pump at a pressure of about 1 atmosphere; and meanwhile, making the internal coagulant bath water enter an insertion tube of the spinneret through a peristaltic pump, making the as-spun fibers directly enter an external coagulation tank of 10% aqueous hydrochloric acid solution at 50° C. for coagulation, and finally, collecting the hollow fiber membrane through a rotary drum; boiling the prepared hollow fiber membrane in water at 40° C. for 48 h to remove the residual solvent; and drying to obtain the hollow fiber tube for a hydrogen fuel cell humidifier.

The prepared hollow fiber membrane is cut as required, and charged in a 5 kw humidifier; and two ends are sealed with waterborne epoxy glue, to assemble the humidifier.

Embodiment 6

Step 1 (synthesis of sulfonated polyarylene ether nitrile resin): adding potassium carbonate (a molar ratio of potassium carbonate to 2,6-difluorobenzonitrile is 1.5:1) and diphenol (a molar ratio of 4,4'-dihydroxy-[1,1'-biphenyl]-3,3'-potassium disulfonate to biphenol is 2:8) to NMP and toluene in sequence (a ratio of the total mass of diphenol, 2,6-difluorobenzonitrile and potassium carbonate to the total volume of NMP and toluene solvent is 80%, and a volume ratio of NMP to toluene is 3:1), and fully dissolving; then adding 2,6-difluorobenzonitrile (a molar ratio of 2,6-difluo- Step 2 (synthesis of additive): weighing nano-silica and dispersing in 95% ethanol; performing ultrasonic dispersion for 1-3 h; meanwhile, adding KH570 (the mass of KH570 is 20% of the mass of nano-silica) to 95% ethanol (the ratio of the total mass of nano-silica and KH570 to the total volume of an ethanol aqueous solution is 1:80), stirring and heating for 3 h; controlling the temperature of the solution as 80° C. and pH value as about 5; slowly adding the above dispersed nano-solution; and after reaction for 12 h, performing suction filtration, washing, drying and grinding for later use;

Step 3 (preparation of hollow fiber tube): fully stirring and dissolving the sulfonated polyarylene ether nitrile resin, ethanol, additive (a mass ratio of the sulfonated polyarylene ether nitrile resin, ethanol and additive is 20:5:1) and DMF (a ratio of the mass of the sulfonated polyarylene ether nitrile resin to the volume of DMF is 20%) in a liquid tank of spinning fluid at 60° C., still standing for 48 h, and vacuumizing to remove the residual bubbles in the solution; then metering the spinning fluid in the liquid tank into an annular gap of a spinneret through a metering pump at a pressure of about 1 atmosphere; and meanwhile, making the internal coagulant bath water enter an insertion tube of the spinneret through a peristaltic pump, making the as-spun fibers directly enter an external coagulation tank of 10% aqueous hydrochloric acid solution at 30° C. for coagulation, and finally, collecting the hollow fiber membrane through a rotary drum; boiling the prepared hollow fiber membrane in water at 40° C. for 24 h to remove the residual solvent; and drying to obtain the hollow fiber tube for a hydrogen fuel cell humidifier.

The prepared hollow fiber membrane is cut as required, and charged in a 5 kw humidifier; and two ends are sealed with waterborne epoxy glue, to assemble the humidifier.

Performance Test

The hydrogen fuel cell humidifiers in embodiments 1-6 are detected under the conditions with a gas flow rate of 400 slpm, an inlet temperature of dry gas (humidified gas) of 55° C., a humidity of smaller than 10%, an inlet temperature of wet gas (humidifying gas) of 70° C. and a humidity of larger than 90%. Results are shown in Table 1.

TABLE 1

Performance of Humidifiers in Embodiments 1-6

| Performance | Tube external diameter (um) | Thickness of tube wall (um) | Tensile strength (MPa) | Dry test pressure drop (KPa) | Internal leakage (L/min) | Absolute humidity (kg/m$^3$) |
|---|---|---|---|---|---|---|
| Embodiment 1 | 1300 | 220 | 7 | 4 | 10 | 140 |
| Embodiment 2 | 1260 | 180 | 10 | 3.6 | 8 | 145 |
| Embodiment 3 | 1220 | 170 | 12 | 3.7 | 6 | 130 |
| Embodiment 4 | 1250 | 220 | 11 | 3.5 | 2 | 160 |
| Embodiment 5 | 1170 | 200 | 13 | 3.2 | 2 | 168 |
| Embodiment 6 | 1400 | 190 | 8 | 3.5 | 9 | 135 |

What is claimed is:

1. A preparation method for a hollow fiber membrane material for a high-humidification hydrogen fuel cell humidifier, comprising the following steps:

S0, mixing and fully dissolving sulfonated polyarylene ether nitrile resin, a pore-forming agent, a modified nano-filler and a first solvent to obtain a first mixture which is then subjected to standing and vacuumizing to obtain a spinning fluid; coagulating the spinning fluid in an internal coagulant bath to obtain as-spun fibers; coagulating the as-spun fibers in an external coagulant bath to obtain a crude hollow fiber product; and washing and drying the crude hollow fiber product to obtain the hollow fiber membrane material for the hydrogen fuel cell humidifier, wherein the internal coagulant bath is water; the external coagulant bath is an aqueous hydrochloric acid solution;

the sulfonated polyarylene ether nitrile resin has the structure as follows:

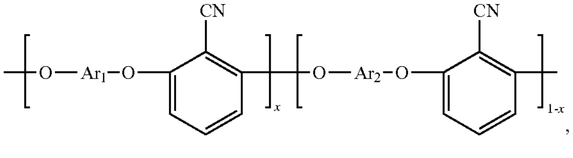

, wherein —Ar$_1$— comprises:

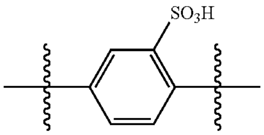

or

-continued

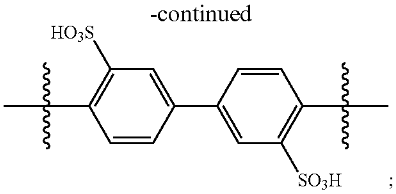

;

—Ar$_2$— comprises:

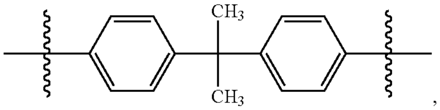

,

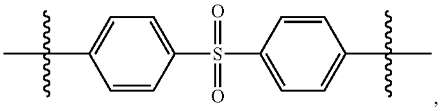

,

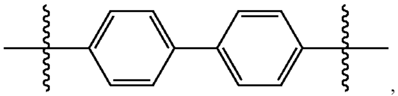

,

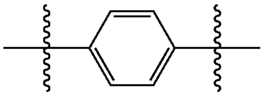

or

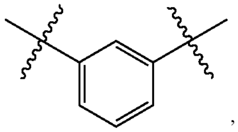

, and 0<x<0.5;

a mass ratio of the sulfonated polyarylene ether nitrile resin, the pore-forming agent and the modified nano-filler is (16-30):(3-8):(0.5-5);

the sulfonated polyarylene ether nitrile resin is prepared by the following method:

S1, mixing and fully dissolving inorganic alkali, diphenol and an organic mixed solvent to obtain a second mixture, wherein the diphenol is selected from the group consisting of a combination of potassium 2,5-dihydroxybenzenesulfonate and biphenol, a combination of potassium 2,5-dihydroxybenzenesulfonate and 4,4'-sulfonyldiphenol, a combination of potassium 2,5-dihydroxybenzenesulfonate and bisphenol A, and a combination of 4,4'-dihydroxy-[1,1'-biphenyl]-3,3'-potassium disulfonate and biphenol;

S2, then adding 2,6-difluorobenzonitrile into the second mixture to obtain a third mixture, and performing heating reflux on the third mixture for reaction;

S3, separating water from the reaction, and gradually raising a temperature of a system of the reaction to 160-170° C. for continuing the reaction;

S4, releasing toluene, raising the temperature of the system to 180-200° C., and stopping the reaction if a viscosity of the system does not change, to obtain a first product;

S5, soaking the first product into acetone, filtering and crushing the first product, then continuing to wash the first product with the acetone, and finally, cleaning the first product with an aqueous hydrochloric acid solution and water in sequence to obtain the sulfonated polyarylene ether nitrile resin;

the modified nano-filler is prepared by the following method:

mixing a nano-filler with an ethanol aqueous solution to obtain a fourth mixture, and ultrasonically dispersing the fourth mixture to obtain a nano-solution; mixing a silane coupling agent with an ethanol aqueous solution to obtain a fifth mixture stirring and heating the fifth mixture, and adjusting a pH value of the fifth mixture to 3-5 to obtain a coupling agent solution; and mixing the nano-solution with the coupling agent solution for reaction to obtain a second product, and then performing post-treatment on the second product to obtain the modified nano-filler.

2. The preparation method for the hollow fiber membrane material for the high-humidification hydrogen fuel cell humidifier according to claim 1, wherein at least one of the following is satisfied:

the pore-forming agent is at least one of polyethylene glycol, ethanol, ethylene glycol, diethylene glycol, polyvinylpyrrolidone, a block polymer of polyoxyethylene ether and polyoxypropylene ether, methanol, n-propanol, isopropanol and glycerol;

the first solvent is at least one of NMP, DMF, DMAc and DMSO;

the modified nano-filler is at least one of nano-calcium oxide, nano-zinc oxide, nano-titanium dioxide, nano-silica, nano-zirconia, nano-cerium dioxide and nano-silicon carbide.

3. The preparation method for the hollow fiber membrane material for the high-humidification hydrogen fuel cell humidifier according to claim 1, wherein a ratio of a mass of the sulfonated polyarylene ether nitrile resin to a volume of the first solvent is 15-50%.

4. The preparation method for the hollow fiber membrane material for the high-humidification hydrogen fuel cell humidifier according to claim 1, wherein in S0, at least one of the following is satisfied:

a temperature of dissolution is 30-150° C.;

time for the standing is 12-72 h;

a mass concentration of the aqueous hydrochloric acid solution is 5-30%;

a temperature of the external coagulant bath is 30-70° C.;

a temperature of washing is 40-60° C.; and water boiling is performed for 12-72 h.

5. The preparation method for the hollow fiber membrane material for the high-humidification hydrogen fuel cell humidifier according to claim 1, wherein in preparing the sulfonated polyarylene ether nitrile resin, at least one of the followings is satisfied:

a molar ratio of the diphenol, the 2,6-difluorobenzonitrile and the inorganic alkali is 1:(1-1.01):(1-1.5);

the organic mixed solvent is a mixed solvent of at least one of NMP, DMAc, sulfolane, diphenyl sulfone and DMF and toluene; and a volume ratio of one of NMP, DMAc, the sulfolane, the diphenyl sulfone and DMF to toluene is (4-2.5):1;

the inorganic alkali is at least one of $Na_2CO_3$, $K_2CO_3$, KF, $NaHCO_3$ and $KHCO_3$;

a ratio of a total mass of the diphenol, the 2,6-difluorobenzonitrile and the inorganic alkali to a total volume of the organic mixed solvent is 60-90%;

in step S2, a temperature of heating reflux is 140-145° C.;

in step S2, time for heating reflux is 2.5-3 h;

in step S3, the continued reaction is performed for 1-2 h.

6. The preparation method for the hollow fiber membrane material for the high-humidification hydrogen fuel cell humidifier according to claim 1, wherein in preparing the modified nano-filler, at least one of the following is satisfied:

a concentration of the ethanol aqueous solution is 70-95%;

time for ultrasonic dispersion is 1-3 h;

the silane coupling agent is at least one of γ-aminopropyltriethoxysilane, γ-(2,3-epoxypropoxy) propyltrimethoxysilane, γ-methacryloxypropyltrimethoxysilane, N-(β-aminoethyl)-γ-aminopropyltrimethoxysilane and N-(β-aminoethyl)-γ-aminopropylmethyldimethoxysilane;

a mass of the silane coupling agent is 5-30% of the mass of the nano-filler;

time for stirring and heating is 2-5 h;

the pH value is adjusted using an aqueous hydrochloric acid solution;

a temperature of the obtained coupling agent solution is controlled at 50-80° C.;

a ratio of a total mass of the nano-filler and the silane coupling agent to a total volume of the ethanol aqueous solution is 1:(50-200);

a mixing mode of the nano-solution and the coupling agent solution is to add the nano-solution to the coupling agent solution dropwise;

time for the reaction is 8-12 h.

7. A hollow fiber membrane material for a high-humidification hydrogen fuel cell humidifier prepared using the preparation method of claim 1, having a tube external diameter of 1000-2000 um, a thickness of a tube wall of 100-250 um and a tensile strength of 6-15 MPa.

8. A fuel cell humidifier comprising the hollow fiber membrane material for the high-humidification hydrogen fuel cell humidifier of claim 7.

* * * * *